US008831791B2

(12) United States Patent
Angell et al.

(10) Patent No.: US 8,831,791 B2
(45) Date of Patent: *Sep. 9, 2014

(54) PROCESSOR COOLING MANAGEMENT

(75) Inventors: Robert L. Angell, Salt Lake City, UT (US); David W. Cosby, Raleigh, NC (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,796

(22) Filed: Jun. 21, 2012

(65) Prior Publication Data
US 2012/0265365 A1    Oct. 18, 2012

Related U.S. Application Data

(63) Continuation of application No. 12/432,611, filed on Apr. 29, 2009.

(51) Int. Cl.
| | |
|---|---|
| G05D 23/00 | (2006.01) |
| G06F 9/46 | (2006.01) |
| G06F 9/45 | (2006.01) |
| G06F 7/38 | (2006.01) |
| G06F 1/20 | (2006.01) |

(52) U.S. Cl.
CPC ..................................... G06F 1/206 (2013.01)
USPC ........... 700/300; 713/300; 716/100; 717/161; 712/221

(58) Field of Classification Search
CPC .................................................... G05B 13/048
USPC ............ 700/36, 278, 300; 713/300, 320, 322; 718/100, 102; 717/161; 712/221
See application file for complete search history.

(56) References Cited

U.S. PATENT DOCUMENTS 5,557,551 A * 9/1996 Craft .............................. 702/130
5,745,737 A * 4/1998 Kayes et al. .................... 703/13

(Continued)

FOREIGN PATENT DOCUMENTS

| CN | 1506662 A | 6/2004 |
|---|---|---|
| CN | 1981254 A | 6/2007 |

(Continued)

OTHER PUBLICATIONS

Chinese Office Action Information Materials for IDS, dated Jul. 18, 2011, regarding Chinese Application No. 101048722, 2 pages.

(Continued)

*Primary Examiner* — Darrin Dunn
(74) *Attorney, Agent, or Firm* — Yee & Associates, P.C.; John R. Pivnichny

(57) ABSTRACT

Illustrative embodiments provide a computer implemented method, a data processing system, and a computer program product for adjusting cooling settings. The computer implemented method comprises analyzing a set of instructions of an application to determine a number of degrees by which a set of instructions will raise a temperature of at least one processor core. The computer implemented method further calculates a cooling setting for at least one cooling system for the at least one processor core. The computer implemented method adjusts the at least one cooling system based on the cooling setting. The step of analyzing the set of instructions is performed before the set of instructions is executed on the at least one processor core. The step of adjusting the at least one cooling system is performed before the set of instructions is executed on the at least one processor core.

17 Claims, 3 Drawing Sheets

(56) References Cited

U.S. PATENT DOCUMENTS

| | | | |
|---|---|---|---|
| 5,870,614 A * | 2/1999 | Ang | 713/320 |
| 5,941,991 A * | 8/1999 | Kageshima | 713/340 |
| 5,974,438 A * | 10/1999 | Neufeld | 718/104 |
| 6,000,036 A | 12/1999 | Durham et al. | |
| 6,029,119 A * | 2/2000 | Atkinson | 702/132 |
| 6,513,124 B1 * | 1/2003 | Furuichi et al. | 713/322 |
| 6,754,812 B1 | 6/2004 | Abdallah et al. | |
| 6,772,352 B1 * | 8/2004 | Williams et al. | 713/300 |
| 6,775,787 B2 | 8/2004 | Greene | |
| 6,823,240 B2 | 11/2004 | Cooper | |
| 6,988,213 B1 * | 1/2006 | Khazam | 713/320 |
| 7,099,735 B2 * | 8/2006 | Jain et al. | 700/132 |
| 7,100,060 B2 | 8/2006 | Cai et al. | |
| 7,167,778 B2 | 1/2007 | Yazawa et al. | |
| 7,191,088 B1 * | 3/2007 | Reed et al. | 702/130 |
| 7,289,939 B2 | 10/2007 | Cascaval et al. | |
| 7,313,709 B2 | 12/2007 | Dang et al. | |
| 7,330,983 B2 | 2/2008 | Chaparro et al. | |
| 7,347,621 B2 | 3/2008 | Sri-Jayantha et al. | |
| 7,349,762 B2 | 3/2008 | Omizo et al. | |
| 7,373,269 B2 | 5/2008 | Furuichi et al. | |
| 7,574,321 B2 * | 8/2009 | Kernahan et al. | 702/179 |
| 7,620,832 B2 | 11/2009 | Kissell | |
| 7,653,824 B2 | 1/2010 | Rangarajan et al. | |
| 7,673,158 B2 * | 3/2010 | Dang et al. | 713/300 |
| 7,703,085 B2 | 4/2010 | Poznanovic et al. | |
| 7,770,176 B2 | 8/2010 | Maeda et al. | |
| 7,814,489 B2 | 10/2010 | Uemura et al. | |
| 7,921,313 B2 | 4/2011 | Ghiasi et al. | |
| 7,992,151 B2 | 8/2011 | Warrier et al. | |
| 8,051,276 B2 | 11/2011 | Krieger et al. | |
| 8,180,501 B2 | 5/2012 | Lewis et al. | |
| 8,235,593 B2 * | 8/2012 | Sri-Jayantha et al. | 374/166 |
| 2002/0055961 A1 * | 5/2002 | Chauvel et al. | 708/100 |
| 2003/0126476 A1 | 7/2003 | Greene | |
| 2003/0225556 A1 * | 12/2003 | Zeidman | 703/14 |
| 2004/0128635 A1 * | 7/2004 | Sahara et al. | 716/6 |
| 2004/0267409 A1 * | 12/2004 | De Lorenzo et al. | 700/299 |
| 2004/0268159 A1 | 12/2004 | Aasheim et al. | |
| 2005/0120252 A1 | 6/2005 | Uwatoko | |
| 2005/0216222 A1 | 9/2005 | Inoue | |
| 2005/0216775 A1 * | 9/2005 | Inoue | 713/300 |
| 2005/0217300 A1 * | 10/2005 | Cheng et al. | 62/259.2 |
| 2005/0223250 A1 * | 10/2005 | Paver | 713/322 |
| 2005/0273208 A1 | 12/2005 | Yazawa et al. | |
| 2006/0004537 A1 * | 1/2006 | Jain et al. | 702/132 |
| 2006/0041872 A1 | 2/2006 | Poznanovic et al. | |
| 2006/0053323 A1 | 3/2006 | Kissell | |
| 2006/0070074 A1 | 3/2006 | Maeda et al. | |
| 2006/0095911 A1 | 5/2006 | Uemura et al. | |
| 2006/0095913 A1 | 5/2006 | Bodas et al. | |
| 2007/0106428 A1 | 5/2007 | Omizo et al. | |
| 2007/0124618 A1 | 5/2007 | Aguilar, Jr. et al. | |
| 2007/0168151 A1 * | 7/2007 | Kernahan et al. | 702/132 |
| 2007/0198134 A1 | 8/2007 | Adachi et al. | |
| 2007/0225871 A1 | 9/2007 | Karstens | |
| 2007/0260894 A1 | 11/2007 | Aguilar, Jr. et al. | |
| 2008/0022076 A1 | 1/2008 | Krieger et al. | |
| 2008/0034232 A1 | 2/2008 | Rangarajan et al. | |
| 2008/0059775 A1 | 3/2008 | Dang et al. | |
| 2008/0134191 A1 | 6/2008 | Warrier et al. | |
| 2008/0209243 A1 | 8/2008 | Ghiasi et al. | |
| 2009/0100437 A1 * | 4/2009 | Coskun et al. | 718/105 |
| 2009/0327012 A1 | 12/2009 | Sharma et al. | |
| 2010/0131120 A1 | 5/2010 | Lewis et al. | |
| 2010/0235011 A1 * | 9/2010 | Tolia et al. | 700/296 |
| 2010/0280680 A1 | 11/2010 | Angell et al. | |

FOREIGN PATENT DOCUMENTS

| | | |
|---|---|---|
| CN | 101048722 B | 12/2011 |
| EP | 1734446 A1 | 12/2006 |
| GB | 2421325 A | 6/2006 |
| JP | 2009288580 A | 11/1997 |
| JP | H11167434 A | 6/1999 |
| JP | 2001282548 A | 10/2001 |
| JP | 2002268769 A | 9/2002 |
| JP | 2007193775 A | 8/2007 |
| JP | 2007323347 A | 12/2007 |
| JP | 2008198072 A | 8/2008 |
| WO | 03083693 A1 | 10/2003 |
| WO | 2007029253 A2 | 3/2007 |

OTHER PUBLICATIONS

Office Action, dated Aug. 1, 2011, regarding U.S. Appl. No. 12/432,611, 20 pages.

Response to Office Action, dated Sep. 1, 2011, regarding U.S. Appl. No. 12/432,611, 21 pages.

Final Office Action, dated Feb. 1, 2012, regarding U.S. Appl. No. 12/432,611, 18 pages.

Notice of Allowance, dated Jun. 13, 2012, regarding U.S. Appl.n No. 12/432,611, 18 pages.

Chinese Office Action Information Materials for IDS, dated May 28, 2012, regarding Chinese Application No. 101048722, 1 page.

* cited by examiner

PROCESSOR COOLING MANAGEMENT

This application is a continuation application of U.S. patent application Ser. No. 12/432,611, filed Apr. 29, 2009, status pending.

BACKGROUND

1. Field

The present invention relates generally to processor cooling management and more specifically to adjusting processor cooling settings prior to the processor temperatures changing based on required energy for a set of instructions.

2. Description of the Related Art

Providing multiple processors in the same chassis and cooling by the same cooling systems enhances thermal energy and cost efficiency. However, some of the gains of consolidated cooling can be partially offset by inefficiencies of mismatched cooling. In other words, one processor may demand high intensity cooling due to its workload, while other modules demand low intensity cooling.

One way to increase efficiency for cooling is making uniform use of cooling across all processors. Each processor has an even temperature. Increasing the efficiency can also be done by assigning the tasks with the highest heat emissions to the processors whose temperatures are the lowest.

SUMMARY

Illustrative embodiments provide a computer implemented method, a data processing system, and a computer program product for adjusting cooling settings. The computer implemented method comprises analyzing a set of instructions of an application to determine a number of degrees by which a set of instructions will raise a temperature of at least one processor core. The computer implemented method further calculates a cooling setting for at least one cooling system for the at least one processor core. The computer implemented method adjusts the at least one cooling system based on the cooling setting. The step of analyzing the set of instructions is performed before the set of instructions is executed on the at least one processor core. The step of adjusting the at least one cooling system is performed before the set of instructions is executed on the at least one processor core.

DETAILED DESCRIPTION

Figure 1:
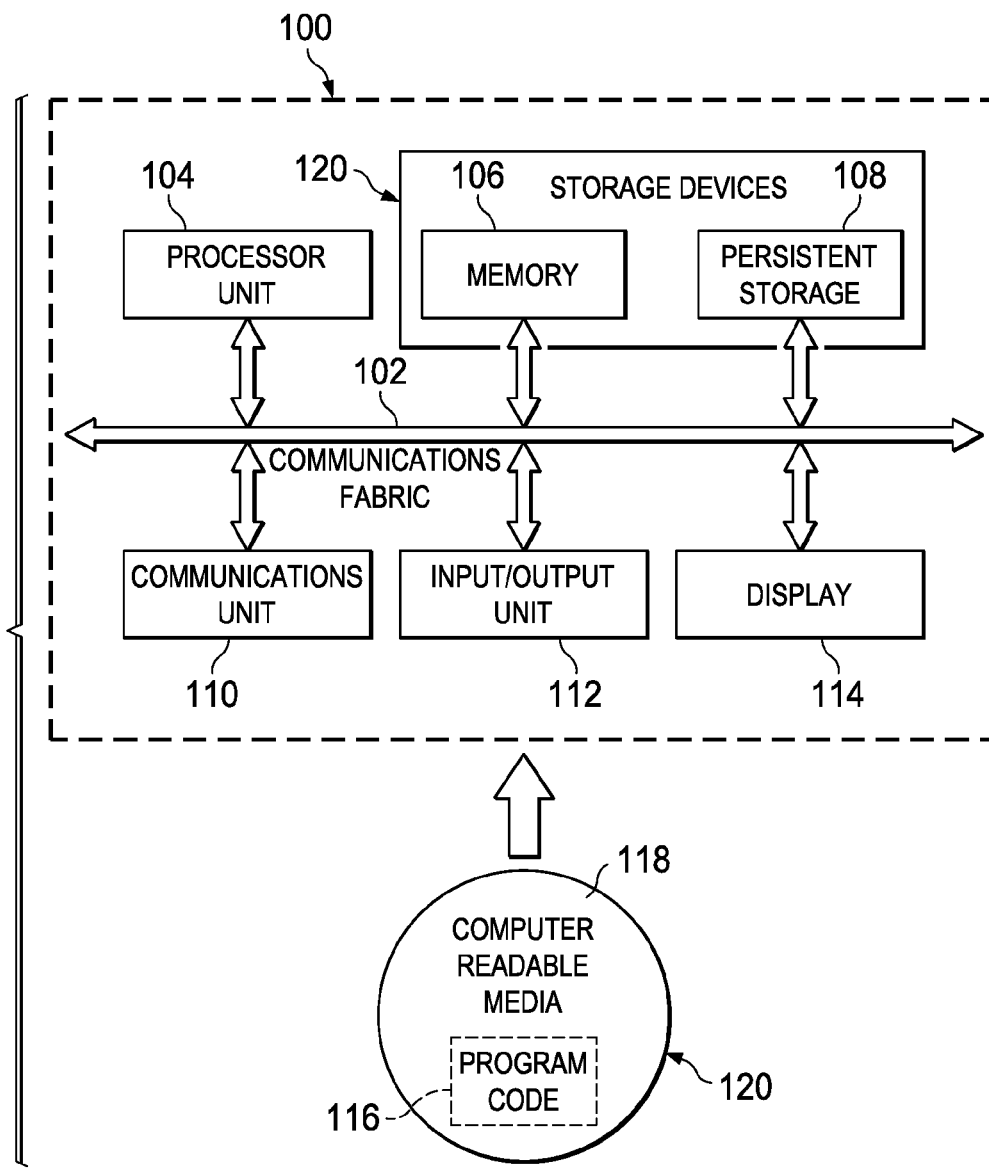
FIG. 1 is a diagram of a data processing system depicted in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114. As used herein, the term "processor" may be used interchangeably with "processor core" and "processor unit".

Processor unit 104 serves to execute instructions for software that may be loaded into memory 106. Processor unit 104 may be a set of one or more processors, or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Figure 2:
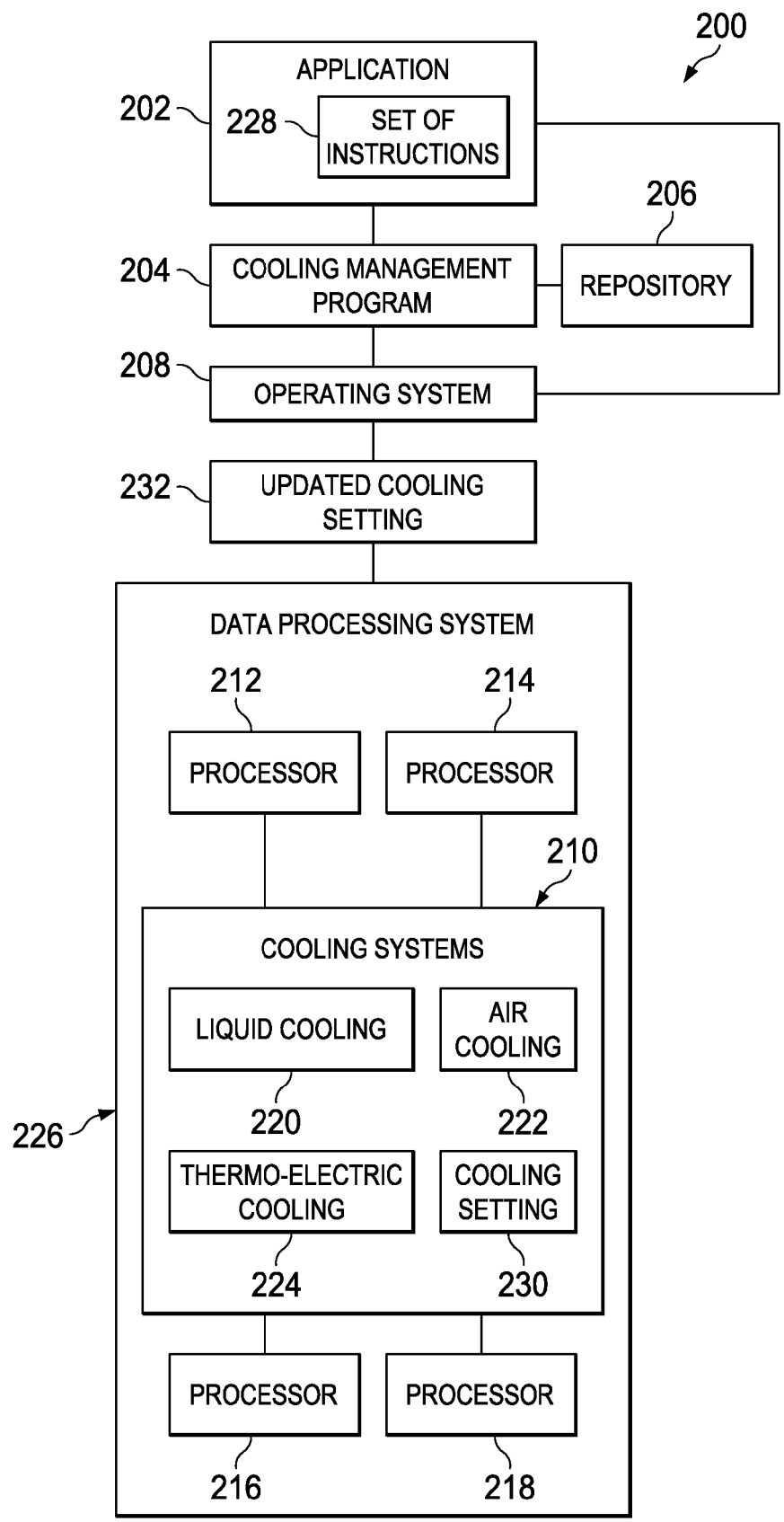
FIG. 2 is a block diagram of components of cooling management system in accordance with an illustrative embodiment.

In an illustrative embodiment of the invention, processor unit 104 may be cooled by a cooling system, such as cooling system 210, as shown in FIG. 2. The type of cooling and amount of cooling provided to processor unit 104 may be determined by the amount of energy a set of instructions to be executed by processor unit 104 will require.

Memory 106 and persistent storage 108 are examples of storage devices. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communication links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 120, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communication links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

With reference to FIG. 2, a block diagram of components of cooling management system 200 in accordance with illustrative embodiments is shown. Cooling management system 200 relies on components of data processing system 100 of FIG. 1, in operation, but these components will not be addressed. In this illustrative embodiment, components of cooling management system 200 comprise application 202, cooling management program 204, repository 206, operating system 208, and data processing system 226. Data processing system 226 further comprises cooling system 210 and processors 212-218. Each processor 212, 214, 216, and 218 may be a set of one or more processors or may be a multi-processor core, depending on the particular implementation. Further, each processor 212, 214, 216, and 218 may be implemented using one or more heterogeneous processor systems in which a main processor is present with secondary processors on a single chip. As another illustrative example, each processor 212, 214, 216, and 218 may be a symmetric multi-processor system containing multiple processors of the same type.

Cooling system 210 further comprises at least one of liquid cooling 220, air cooling 222, thermo-electric cooling 224, and/or some other suitable cooling device. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C. This example may also include just item B and item C.

Application 202 may be any type of application running on a computer system. Application 202 is in the form of program code in a functional form that may be executed by a processor unit, such as processor unit 104 and or processors 212-218. Application 202 may contain a source code or an executable machine code. Normally, application 202 communicates with operating system 208 during the normal course of operation of application 202. For example, application 202 may communicate with operating system 208 through an application programming interface (API).

In this illustrative embodiment, cooling management program 204 may identify the set of instructions which are being executed next, such as set of instructions 228. Set of instructions 228 may comprise a loop or any other set of instructions as small as a single instruction and as large as an entire application. A set as used herein with reference to an item means one or more items. For example, set of instructions 228 may be one or more instructions. Cooling management program 204 may analyze set of instructions 228 to determine a number of degrees by which set of instructions 228 will raise a temperature of at least one processor core.

Cooling management program 204 may retrieve information about set of instructions 228 from repository 206. For example, if set of instructions 228 is performing a certain calculation, the repository may contain information on how much energy the calculation will consume when executed. Cooling management program 204 determines the amount of energy set of instructions 228 will consume and combines this with the thermal inertia of the processor to determine an amount and/or rate of change for the processor. Repository 206 may be any form of storage, such as persistent storage 108 as shown in FIG. 1. Also, repository 206 may be included on the same device, computer, or cooling management system, such as cooling management program 204, but may also be located in a remote location and/or on a server.

Cooling management program 204 uses the information from the processor and in the repository in a constraint equation to determine an updated cooling setting for data processing system 226. Cooling management program 204 may also determine which cooling system or in what combination to use the cooling systems. Cooling management program 204 sends the updated cooling setting 230 to operating system 208. Operating system 208 may change cooling setting 230 of cooling system 210 in accordance with the updated cooling setting 232 received from cooling management program 204.

The energy consumed will cause a processor, such as processors 212-218 to increase in temperature. A feature provided by this illustrative embodiment is that the future change in temperature for processors 212, 214, 216, and 218 is known prior to the actual change in temperature. This is helpful in increasing the life of a processor. Additionally, since the change in temperature is known prior to the change occurring, operating system 208 is more efficiently able to adjust cooling setting 230 of the at least one cooling systems.

Cooling setting 230 may be adjusted to increase the efficiency of cooling systems 210 based on a constraint equation. The constraint equation may have many constraints such as a maximum temperature for a processor or a range in which the temperature must remain. A desired temperature profile indicates cooling setting 230 for each processor in a processor unit. The temperature profile is the collective settings on each cooling system and each processor in a processor unit.

The constraint equation maximizes the efficiency based on minimizing energy costs and/or monetary costs. For example, it may be determined that processor 212 will be receiving a block of instructions which require a high amount of energy. In this example, cooling management program 204 determines, based on a constraint equation, that the cooling on processor 212 needs to be turned up to the maximum cooling while turning down the cooling on processors 212, 214, 216, and 218 may be turned down to the minimum cooling. The cooling is increased before set of instructions 228 hits processor 212. Some sets of instructions require more energy than others. The amount of energy set of instructions 228 requires may be found in the repository.

Additionally, if the set of instructions 228 is a wait loop, cooling management program 204 may determine that the cooling may be turned down on at least one processor 212, 214, 216, or 218 due to the absence of set of instructions 228. A loop may also contain an incremental counter which allows cooling management program 204 to determine the energy cost of the entire set of iterations of the loop. Cooling management program 204 may take into account the number and/or percentage of times application 202 takes a branch instruction. The number and/or percentage of times application 202 executes a branch instruction that may be used in the calculation of the cooling settings. For example, if branch instruction A is executed 99% of the time, cooling management program 204 may adjust the cooling settings to take into account the energy requirements of branch instruction A before branch instruction A is executed because of the high probability of branch instruction A being executed. Cooling management program 202 may also use compiler hints on a section of application 202 to determine if a set of instructions 228 may run in parallel on multiple processors. For example, a compiler hint may indicate that a loop and/or set of instructions 228 contains a procedure call. If a loop contains a procedure call then it will likely not be run in parallel since the parallel loops would interfere with any variables local to that function. Alternatively, if a loop can run in parallel, cooling management program 204 will take into account the parallel/multithread processing when updating the cooling settings.

The repository may be pre-loaded with the information or updated dynamically. For example, the repository may be updated every time a new set of instructions is executed. The information may be taken from how much the new set of instructions raised the temperature of a processor. The energy needed by set of instructions 228 may be represented in British Thermal Units (BTU). Additionally, the repository may contain the thermal inertia for each processor 212, 214, 216, and 218. The thermal inertia is used by cooling management program 204 to determine the amount and rate of change of temperature for each of processors 212, 214, 216, and 218.

The illustration of cooling management system 200 in FIG. 2 is not meant to imply physical or architectural limitations on the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, cooling management program 204 may be applied to more than one application. Also, cooling management program 204 may directly change the cooling settings in cooling systems 210. Additionally, cooling system 204 may be implemented as microcode in data processing system 226, processor 212-218, and/or cooling systems 210.

Figure 3:
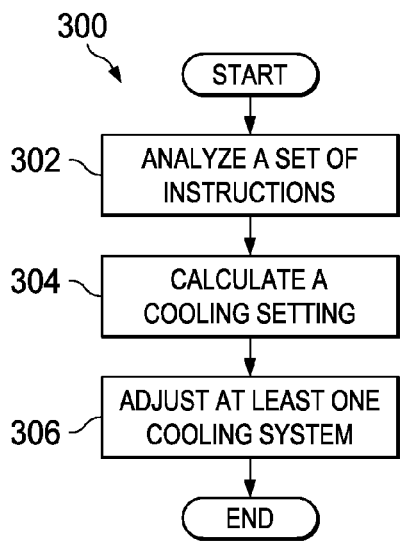
FIG. 3 is a flowchart of a process using cooling management system in accordance with an illustrative embodiment.

With reference to FIG. 3, a flowchart of a process using cooling management system 200 of FIG. 2, in accordance with illustrative embodiments is shown. The process may be implemented by cooling management program 204 of FIG. 2.

The process starts and analyzes a set of instructions of an application to determine a number of degrees by which a set of instructions will raise a temperature of at least one processor (step 302). The set of instructions are analyzed prior to execution of the set of instructions on a processor. A calculation of a cooling setting is made for at least one cooling system for the at least one processor (step 304). The calculation of a cooling setting may be based on the constraint equation. The constraint equation may use the temperature of each processor, energy costs, monetary costs, the thermal inertia of each processor, and/or any other feature related to a processor. Then, an adjustment is made on the at least one cooling system based on the cooling setting (step 306). Adjusting the cooling system comprises turning off, turning on, increasing the intensity, and/or decreasing the intensity of at least one cooling system, or any combination thereof. Thereafter the process terminates.

Figure 4:
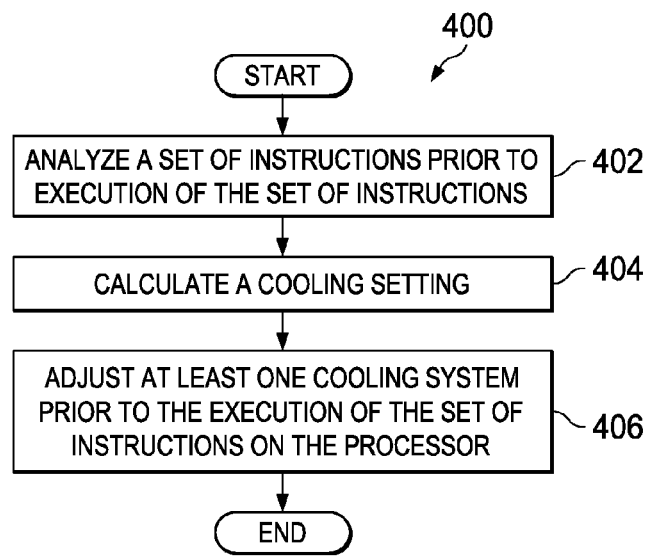
FIG. 4 is a flowchart of a process using cooling management system in accordance with an illustrative embodiment.

With reference to FIG. 4, a flowchart of a process using cooling management system 200 of FIG. 2, in accordance with illustrative embodiments is shown. The process may be implemented by cooling management program 204 of FIG. 2.

The process starts and analyzes a set of instructions of an application to determine a number of degrees by which a set of instructions will raise a temperature of at least one processor prior to the set of instructions being executed on the processor (step 402). A calculation of a cooling setting is made for at least one cooling system for the at least one processor (step 404). An adjustment is made on the at least one cooling system based on the cooling setting prior to the set of instructions being executed on the processor (step 406). Thereafter the process terminates.

Figure 5:
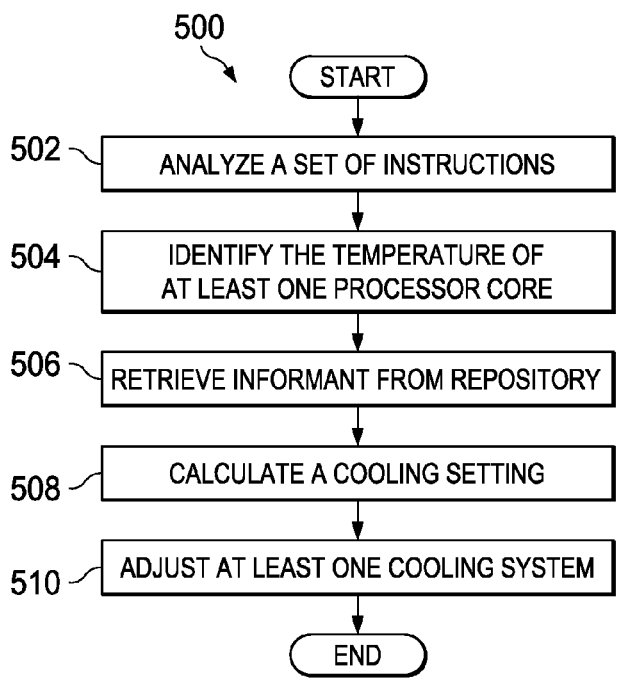
FIG. 5 is a flowchart of a process using cooling management system in accordance with an illustrative embodiment.

With reference to FIG. 5, a flowchart of a process using cooling management system 200 of FIG. 2, in accordance with illustrative embodiments is shown. The process may be implemented by cooling management program 204 of FIG. 2.

The process starts and analyzes a set of instructions of an application to determine a number of degrees by which a set of instructions will raise a temperature of at least one processor core prior to the set of instructions being executed on the processor core (step 502). A temperature of the at least one processor core is identified (step 504). Information on the set of instructions is retrieved from a repository (step 506). The repository comprises information on a plurality of sets of instructions. The information comprises energy consumption data for each of the plurality of the sets of instructions. The information comprises thermal inertia data for each of the at least one processor core. A calculation of a cooling setting is made for at least one cooling system for the at least one processor core (step 508). An adjustment is made on the at least one cooling system based on the cooling setting prior to the set of instructions being executed on the processor core (step 510). Thereafter the process terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One or more illustrative embodiments may provide a more efficient cooling technique compared to currently available cooling techniques. The illustrative embodiments may provide look-ahead cooling. Look-ahead cooling allows changing the cooling on a processor before or just as the processor begins to change in temperature. Look-ahead cooling determines the change in temperature of a processor before the change occurs by calculating the energy requirements of a set of instructions being sent to the processor.

One or more illustrative embodiments may provide utilizing a constraint equation to determine a desired maximum temperature or a desired temperature range for a processor and/or set of processors. Using a constraint equation provides maximizing the efficiency of the processors, cooling system, energy costs, and/or monetary costs.

In one or more illustrative embodiments the cooling management system may identify a temperature change for a number of processors in a processor unit that will occur from executing a set of instructions. Next, the cooling management system may identify a change to a cooling system associated with the number of processors to maintain a desired temperature profile for the processor unit to form an identified change. Then the cooling management system and/or the operating system may adjust the cooling system using the identified change. Additionally, a constraint equation may be used to identify the change. The change may be an updated cooling setting for the cooling system.

In one or more illustrative embodiments the cooling management system may identify a temperature change for a number of processors in a processor unit that will occur from executing a set of instructions. Next, the cooling management system may identify a change to workload associated with the number of processors to maintain a desired temperature profile for the processor unit to form an identified change. The workload is the amount and type of instruction being sent to a certain processor. Then the cooling management system and/or the operating system may adjust the workload using the identified change. For example, the operating system may send more energy intensive instructions to a processor which has a low temperature and a high maximum temperature. A constraint equation may be used to determine the maximum efficiency of the distribution of the workload. A constraint equation may be used to identify the change.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for adjusting cooling settings, comprising:
retrieving information about a set of instructions of an application from a persistent storage data repository, wherein the repository comprises the information on a plurality of sets of instructions, wherein the information for the set of instructions comprises energy consumption data for each of the plurality of the set of instructions, and wherein the information comprises thermal inertia data for each of the at least one processor core;
analyzing the set of instructions of the application to determine a probability that the set of instructions will be executed and a number of degrees by which the set of instructions will raise a temperature of at least one processor core, wherein the probability is based on a historical analysis of branching to the set of instructions, wherein the analyzing the set of instructions is performed before the set of instructions is executed on at least one processor core, wherein the number of degrees is determined using a thermal inertia of the at least one processor core and information for the set of instructions;

calculating a cooling setting for at least one cooling system for the at least one processor core based on the historical probability and the number of degrees; and adjusting the at least one cooling system based on the cooling setting, wherein adjusting the at least one cooling system is performed before the set of instructions is executed in the at least one processor core.

2. The method of claim 1 further comprising:
identifying the temperature of at least one processor core.

3. The method of claim 1, wherein adjusting the at least one cooling system comprises adjusting, on each of the at least one processor core, a combination selected from a group of turning off the at least one cooling system, turning on the at least one cooling system, increasing an intensity of the at least one cooling system, and decreasing the intensity of the at least one cooling system.

4. The method of claim 1, wherein calculating the cooling setting comprises using a constraint equation, the constraint equation using a temperature of the at least one processor core and the thermal inertia of the at least one processor core.

5. The method of claim 4, wherein the constraint equation is based on energy costs and monetary costs.

6. The method of claim 1, wherein analyzing the set of instructions comprises identifying a counter located in the set of instructions, wherein the counter enables determining the energy cost of a set of iterations of a loop.

7. The method of claim 1, wherein analyzing the set of instructions comprises identifying a percentage of times a branch instruction is executed.

8. The method of claim 1, wherein analyzing the set of instructions comprises identifying, by using compiler hints, whether the set of instructions can be run in parallel.

9. A data processing system for adjusting cooling settings, the data
processing system comprising:
a bus;
a memory connected to the bus, the memory comprising computer executable instructions;
a communications unit connected to the bus; and
a processor unit connected to the bus, wherein the processor unit executes the computer executable instructions directing the data processing system to:
retrieve information about a set of instructions of an application from a persistent storage data repository, wherein the repository comprises the information on a plurality of sets of instructions, wherein the information for the set of instructions comprises
energy consumption data for each of the plurality of the set of instructions, and wherein the information comprises thermal inertia data for each of the at least one processor core; analyze the set of instructions of the application to determine a probability that the set of instructions will be executed and a number of degrees by which the set of instructions will raise a temperature of at least one processor core, wherein the probability is based on a historical analysis of branching to the set of instructions, wherein analyzing the set of instructions is performed before the set of instructions is executed on the at least one processor core, wherein the number of degrees is determined using a thermal inertia of the at least one processor core and information for the set of instructions; calculate a cooling setting for at least one cooling system for the at least one processor core based on the historical probability and the number of degrees; and
adjust the at least one cooling system based on the cooling setting, wherein adjusting the at least one cooling system is performed before the set of instructions is executed on the at least one processor core.

10. The data processing system of claim 9, further comprising instructions directing the data processing system to:
identify the temperature of at least one processor core.

11. The data processing system of claim 9, wherein adjusting the at least one cooling system comprises adjusting, on each of the at least one processor, a combination selected from a group of turning off the at least one cooling system, turning on the at least one cooling system, increasing an intensity of the at least one cooling system, and decreasing the intensity of the at least one cooling system.

12. The data processing system of claim 9, wherein calculating the cooling setting comprises using a constraint equation, the constraint equation using a temperature of the at least one processor core and the thermal inertia of the at least one processor core.

13. A non-transitory computer readable storage medium storing a computer program product for adjusting cooling settings, the computer program product comprising computer executable instructions comprising:
instructions for retrieving information about a set of instructions of an application from a persistent storage data repository, wherein the repository comprises the information on a plurality of sets of instructions, wherein the information for the set of instructions comprises energy consumption data for each of the plurality of the set of instructions, and wherein the information comprises thermal inertia data for each of the at least one processor core;
instructions for analyzing the set of instructions of the application to determine a probability that the set of instructions will be executed and a number of degrees by which the set of instructions will raise a temperature of at least one processor core, wherein the probability is based on a historical analysis of branching to the set of instructions, wherein analyzing the set of instructions is performed before the set of instructions is executed on the at least one processor core, wherein the number of degrees is determined using a thermal inertia of the at least one processor core and information for the set of instructions;
instructions for calculating a cooling setting for at least one cooling system for the at least one processor core based on the historical probability and the number of degrees; and
instructions for adjusting the at least one cooling system based on the cooling setting, wherein adjusting the at least one cooling system is performed before the set of instructions is executed on the at least one processor core.

14. A method for managing cooling of a process unit, the method comprising:
retrieving information about a set of instructions of an application from a persistent storage data repository, wherein the repository comprises the information on a plurality of sets of instructions, wherein the information for the set of instructions comprises energy consumption data for each of the plurality of the set of instructions, and wherein the information comprises thermal inertia data for each of the at least one processor core;
identifying a probability that the set of instructions will be executed and a temperature change for a number of processors in a processor unit that will occur from executing the set of instructions, wherein the probability is based on a historical analysis of branching to the set of instructions, wherein the temperature change is identified using a thermal inertia of the number of processors and information for the set of instructions, wherein the thermal inertia of the at least one processor core comprises a rate of change of temperature of the at least one processor core, wherein the temperature change is identified before the set of instructions is executed on the at least one processor core;

based on the historical probability and the number of degrees, identifying a change to a cooling system associated with the number of processors to maintain a desired temperature profile for the processor unit to form an identified change; and adjusting the cooling system using the identified change, wherein adjusting the at least one cooling system is performed before the set of instructions is executed on the at least one processor core.

15. The method of claim 14, wherein the change is identified using a constraint equation.

16. A method for managing cooling of a process unit, the method comprising:

retrieving information about a set of instructions of an application from a persistent storage data repository, wherein the repository comprises the information on a plurality of sets of instructions, wherein the information for the set of instructions comprises energy consumption data for each of the plurality of the set of instructions, and wherein the information comprises thermal inertia data for each of the at least one processor c;

identifying a probability that the set of instructions will be executed and a temperature change for a number of processors in a processor unit that will occur from executing a set of instructions, wherein the probability is based on a historical analysis of branching to the set of instructions, wherein the temperature change is identified using a thermal inertia of the number of processors and information for the set of instructions, wherein the thermal inertia of the at least one processor core comprises a rate of change of temperature of the at least one processor core, wherein the temperature change is identified before the set of instructions is executed on the at least one processor core;

identifying a change to a workload associated with the number of processors to maintain a desired temperature profile for the processor unit based on the historical probability and the number of degrees to form an identified change;

adjusting the workload using the identified change, wherein adjusting the workload is performed before the set of instructions is executed on the at least one processor core.

17. The method of claim 1, wherein:

analyzing the set of instructions is performed before the set of instructions is executed on the at least one processor core;

wherein adjusting the at least one cooling system is performed before the set of instructions is executed on the at least one processor core;

wherein adjusting the at least one cooling system comprises adjusting, on each of the at least one processor core, a combination selected from a group of turning off the at least one cooling system, turning on the at least one cooling system, increasing an intensity of the at least one cooling system, and decreasing the intensity of the at least one cooling system; and wherein determining a number of degrees further comprises: retrieving information on a set of instructions in a repository, wherein the repository comprises the information on a plurality of sets of instructions, wherein the information comprises energy consumption data for each of the plurality of the sets of instructions, and wherein the information further comprises thermal inertia data for each of the at least one processor cores.

* * * * *